United States Patent [19]

Peterson

[11] 4,165,512
[45] Aug. 21, 1979

[54] RECORDING APPARATUS

[75] Inventor: Dean M. Peterson, Littleton, Colo.

[73] Assignee: Honeywell Inc., Minneapolis, Minn.

[21] Appl. No.: 891,077

[22] Filed: Mar. 29, 1978

Related U.S. Application Data

[63] Continuation-in-part of Ser. No. 833,309, Sep. 13, 1977, abandoned.

[51] Int. Cl.² .................... G01D 9/00; G01D 9/42; H05B 3/34
[52] U.S. Cl. .................... 346/24; 346/110 R; 219/216
[58] Field of Search ............... 346/22, 24, 25, 110 R

[56] References Cited

U.S. PATENT DOCUMENTS

| | | | |
|---|---|---|---|
| 3,121,604 | 2/1964 | Hull | 346/22 |
| 3,324,451 | 6/1967 | Richard | 346/110 R X |
| 3,346,867 | 10/1967 | Schwarzer | 346/110 R X |
| 3,887,787 | 6/1975 | Gregg | 219/216 |
| 3,938,164 | 2/1976 | Ohnishi et al. | 346/110 R |
| 3,953,210 | 4/1976 | Hasegawa et al. | 346/110 R X |

*Primary Examiner*—George H. Miller, Jr.
*Attorney, Agent, or Firm*—Laurence J. Marhoefer; Lockwood D. Burton

[57] ABSTRACT

There has been provided, in accordance with the present invention, a recording system for light sensitive recording medium in which a latent image is developed by heating the photographic emulsion by means of a current passing through a conductive coating on the back of the record member. The record member is exposed to a light pattern to impose a latent image over a predetermined sheet length of recording medium. The recording medium is driven past the exposure station by a driving roller, a roller which may be the driving roller engaging the conductive back surface of the recording medium being grounded. The medium is driven past a shear mechanism to a clamp device. The clamp device grips the forward end of the record medium and serves as an electrode to pass an electrical current through the conductive back surface to the grounded roller to develop the latent image. The shear mechanism is then actuated to sever the sheet lengths. The clamp device then releases the severed sheets.

18 Claims, 3 Drawing Figures

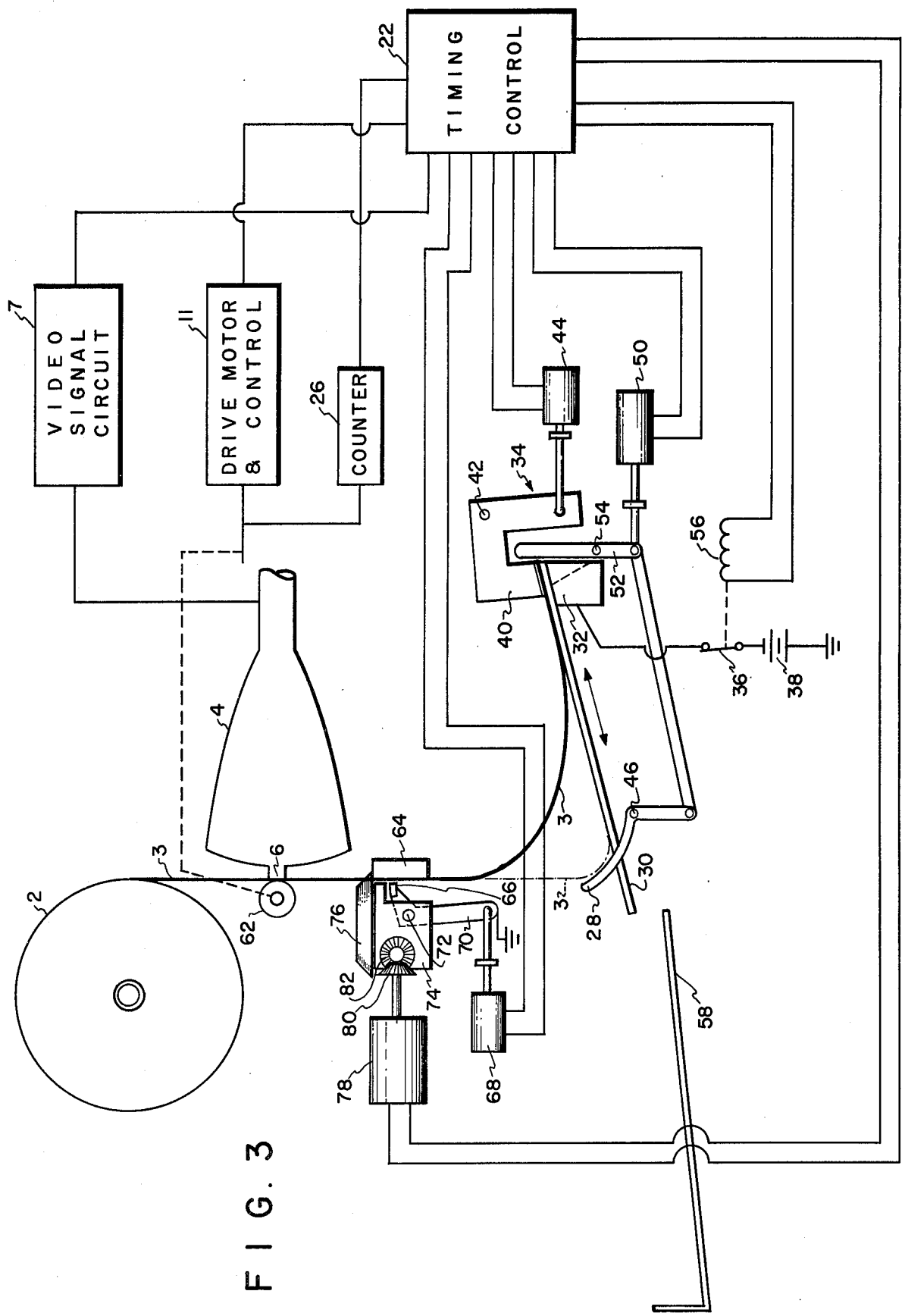

RECORDING APPARATUS

CROSS-REFERENCE TO RELATED APPLICATIONS

The present application is a continuation-in-part of copending application Ser. No. 833,309 filed 9-13-77 now abandoned.

BACKGROUND OF THE INVENTION

The present invention relates to recording apparatus. More particularly, it relates to a recording apparatus for light sensitive recording media which is developed by the application of heat to a photographic emulsion.

Heretofore, there have been provided recording apparatus for heat-developed light-sensitive recording media; a so called dry silver process. In such previous devices, the light sensitive medium is subjected to a light image to impart a latent image thereto. The exposed medium is then passed over a heated platen to develop the latent image. In that apparatus and process, the transfer of heat through the backing of the medium was relatively slow. The distribution of heat was difficult to control and, because there must be a significant spatial separation between the heating station and the exposure station, there was a significant wastage of recording media.

Subsequently there has been provided a recording medium of the so called dry silver type wherein there is provided an electrically conductive layer either in or on the backing. In a prior art recorder utilizing that improved recording medium, the exposed record member bearing a latent image is passed over a series of spaced rollers with the roller in contact with the conductive backing. The rollers, themselves, are of conductive material with an electrical potential alternately applied thereto. As the record member is passed over the rollers, an electrical current is passed through the conductive backing, generating sufficient heat within the backing to effect a development of the images on the film. That system, shown in U.S. Pat. No. 3,887,787, is a continuous process. As such the heating current is continuously flowing through the backing layer of the record member simultaneously with the exposure of the emulsion side of the record member to the light patterns. The coincidence of the exposure and the application of the heating current to the record member in close proximity to the exposure area tends to result in a combination of radio frequency interference from the light image source, i.e. CRT, and a high voltage from the developer near the imaging station, both tending to have deleterious effects on the record.

SUMMARY OF THE INVENTION

It is accordingly, an object of the present invention to provide an improved recording apparatus which avoids the foregoing shortcomings.

It is another object of the present invention to provide an improved recording apparatus as set forth for a light sensitive, heat developed recording medium having a conductive back surface.

It is a further object of the present invention to provide recording apparatus as set forth for producing individual page or sheet copies.

In accomplishing these and other objects, there has been provided, in accordance with the present invention, a recording system for light sensitive recording medium in which a latent image is developed by heating the photographic emulsion by means of a current passing through a conductive surface on the back of the record member. The record member is exposed to a light pattern to impose a latent image over a predetermined sheet length of recording medium. The recording medium is driven past the exposure station by a driving roller or a pair of rollers, the one engaging the conductive back surface of the recording medium being grounded. The medium is driven past a shear mechanism to a clamp device. The clamp device grips the forward end of the record medium and serves as an electrode to pass an electrical current through the conductive back surface to the grounded roller to develop the latent image. The shear mechanism is then actuated to sever the sheet lengths. The clamp device then releases the severed sheets.

BRIEF DESCRIPTION OF THE DRAWINGS

A better understanding of the present invention may be had from the following detailed description when read in the light of the accompanying drawings in which:

FIG. 3 is a schematic representation of a somewhat different structure also embodying the present invention.

DETAILED DESCRIPTION

Figure 1:
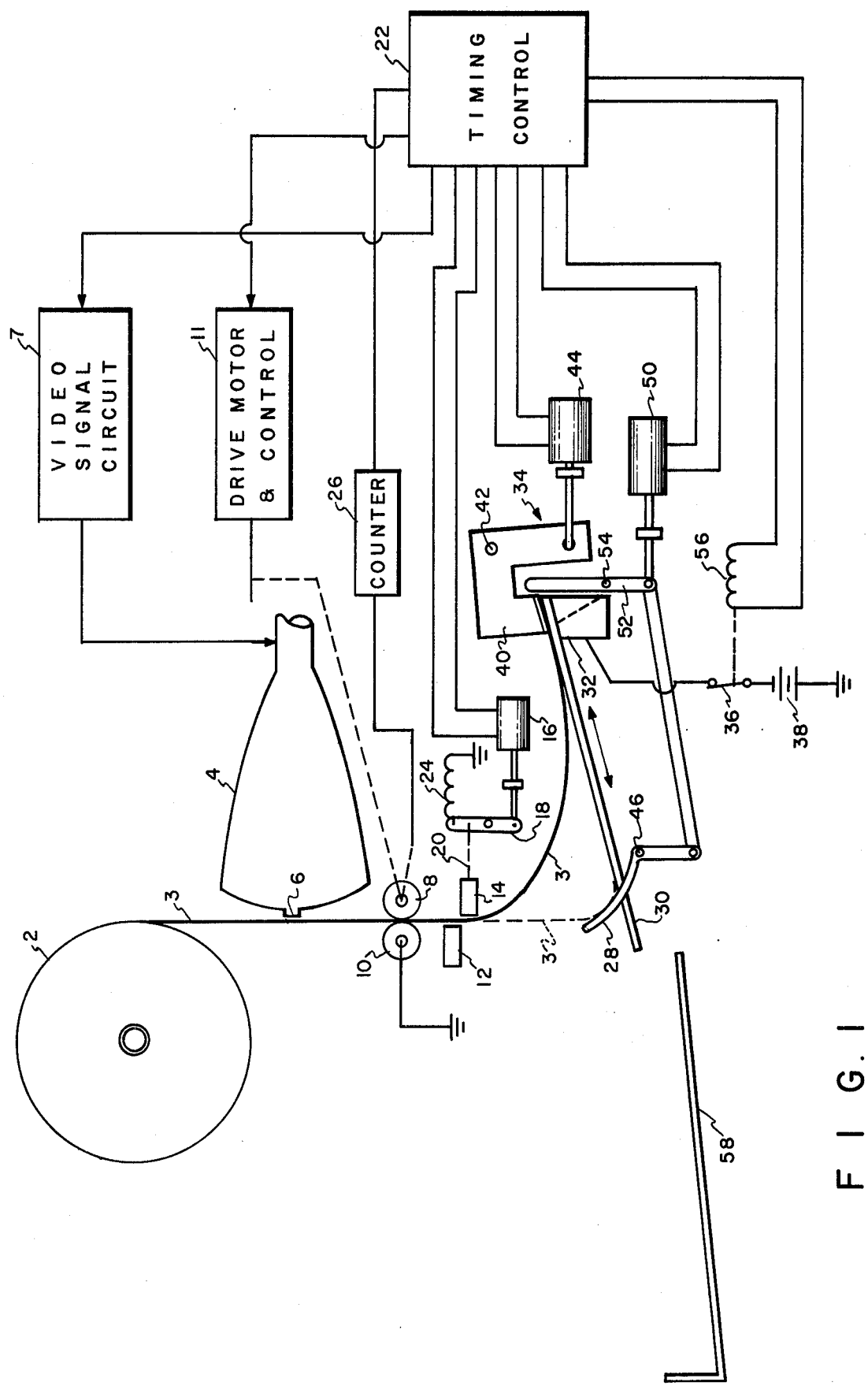
FIG. 1 is a schematic representation of apparatus embodying the present invention and shown in one operative condition.
Figure 2:
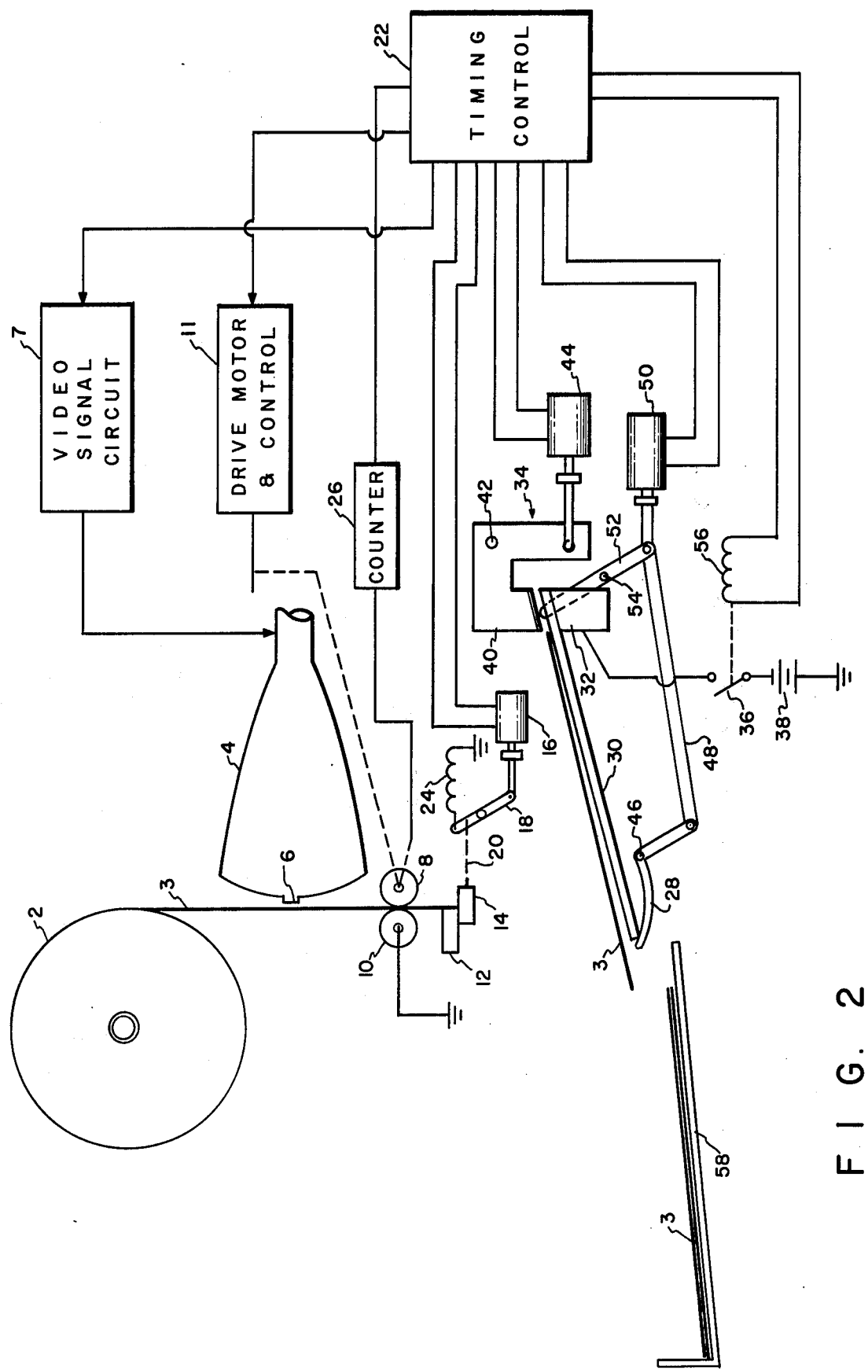
FIG. 2 is a schematic representation of the apparatus shown in the FIG. 1 but in a subsequent operative condition.

Referring now to the drawings in more detail, there is shown in FIGS. 1 and 2, a supply roll of a light sensitive, heat developed recording medium 3 having a photographic emulsion on one surface thereof an electrically conductive opposite or back surface. The record medium is drawn past an exposure station represented by a cathode ray tube (CRT) 4 having a fiber optic strip or band 6 extending across the face plate thereof. The CRT is provided with suitable video signals from a video signal circuit 7 as is well known in the art. A pair of rollers 8 and 10 comprise the means for drawing the record member past the exposure station. Of these, the roller 8 is a drive roller, driven by a motor control 11 operating on the emulsion side of the record medium. On the opposite side of the record medium, the conductive side, the roller 10 is formed of a conductive material and is electrically connected to ground.

As the film, or record medium, 3 is drawn from the supply roll 2, past the CRT 4, by the rollers 8 and 10, it is then driven between a pair of shear blades including a fixed blade 12 and movable blade 14. The movable blade 14 is operated to a cutting position, as shown in FIG. 2, by the actuation of a first solenoid 16. The solenoid 16 acts through a lever 18 and a link 20 (represented by a dotted line) to effect a closure of the shear blade 14. The solenoid 16 is operated under timed control by a timing control circuit 22. A return force is applied to the lever 18 by a spring 24. A counter 26 is connected to count the revolutions of the drive roller 8. An output control signal from the counter 26 is applied as one of the control inputs to the timing control circuit 22.

As the record number 3 is driven through the open blades of the shear 12 and 14, the free end as shown in dotted line 3, engages a deflector 28. The deflector 28 is positioned to turn the free end of the record member to slide upward on a sloping guide tray 30. The guide tray 30 is formed of a nonconductive substance and terminates at the edge of the lower jaw 32 of a clamp 34. The lower jaw 32 of the clamp 34 is formed of an electrically conductive material and is connected through a switch 36 to a source of electrically energy 38. The lower jaw 32 of the clamp 34 is relatively fixed in position. The clamp 34 also includes an upper jaw 40 which is movable about a pivot 42 under the control of a solenoid 44. The solenoid 44 is, in turn, operated under the control of the timing control circuit 22.

The deflector 28 is illustrated as being substantially in the form of a bell crank movable about a pivot 46. The lower arm of the deflector 28 is connected through a linkage bar 48 to the armature of a solenoid 50. The solenoid 50 is also operated under the control of the timing control circuit 22. Also actuated by the solenoid 50 is a kicker bar 52 which is connected at one end to the junction between the linkage bar 48 and the armature of the solenoid 50. The kicker bar 52 is pivoted about a pivot 54 at a point intermediate its ends; the upper ends of the bar extends to a position where it may engage the free end of the record member 3 as it is positioned in the clamp 34. Since the kicker bar 52 is actuated by the same solenoid 50 as is the deflector 28, it is clear that they are simultaneously actuated. The switch 36 which is used to energize the lower jaw 32 of the clamp 34 is actuated by a relay coil 56 which is, in turn, also operated under the control of the timing control circuit 22. A receiving tray 58 is positioned to receive the severed and developed sheets of the record member after the clamp 34 has been released.

In operation, with the blade 14 of the shear assembly withdrawn, as shown in FIG. 1, the recording medium is drawn by the rollers 8 and 10 past the face of the tube 4 wherein the emulsion side of the record member is exposed to a light pattern through the fiber optic strip 6, imposing a latent image on the emulsion side of the record member 3. At the beginning of the cycle, the counter 26 will have been reset to zero. As the recording medium is driven by the rollers 8 and 10, the counter 26 counts the revolutions of the roller 8; a predetermined number of revolutions of the roller 8 being representative of a desired length, e.g., eleven inches. After a predetermined count has been reached in the counter 26, the counter supplies a control signal to the timing control unit 22.

As the record medium is passed, under control of the rollers 8 and 10, between the opened blades 12 and 14 of the shear, the free end of the record member 3 as shown by the dotted line 8 engages deflector 28, causing that free end to turn in the direction of the clamp 34. As the record member continues to be fed from the supply roll 12 through the shear position, the free end slides up the guide tray 30 to a position between the open jaws of the clamp 34, the predetermined length calculated by the counter 26. The control signal which is applied from the counter 26 to the timing control unit 22 temporarily halts the drive of the rollers 8 and 10 by interrupting the operation of the drive motor and control 11, interrupts the operation of the video signal circuit, and simultaneously therewith energizes the solenoid 44 causing the upper jaw 40 of the clamp 34 to clamp the free end of the record member between that upper jaw and the conductive lower jaw 32. Substantially coincident with the closure of the clamp 34, the relay 56 causes the switch 36 to be closed, thereby passing a current from the source 38 to the conductive lower jaw 32, thence through the conductive backing of the record member 3 to the grounded conductive roller 10. That current flow is controlled to produce the necessary heating in the record member itself to effect the developing of the latent image borne on the emulsion side of the record member 3. At the end of a predetermined period of conductions, under the control of the timing control circuit 22, the relay coil 56 is deenergized allowing the switch 36 to be opened. When the switch 36 has been opened, the solenoid 16 is energized, actuating the shear blade 14 to shear off the measured length of record member at a position slightly below the position of the rollers 8 and 10. The solenoid 16 is then deactivated allowing the shear blade 14 to be retracted. As the selected length of the record medium is separated from the upper portion thereof, the sheared end of the record member 3 falls toward the tray 30. As the shear blade 14 is retracted, the solenoid 44, which has actuated the clamp 34 is released, allowing the clamp jaw 40 to open. When that has happened the solenoid 50 is actuated, withdrawing the deflector 28 to a position substantially as shown in FIG. 2, at the same time moving the kicker bar 52 to give a slight kick to the free ends of the sheared record member 3. That slight kick from the kicker bar 52 causes the sheared sheet 3 to move down the sloping guide tray 30 forward and into the receiving tray 58.

After the sheared sheet has been deposited in the tray 58, the timing control circuit releases the solenoid 50 allowing the deflector 28 and the kicker bar 52 to be returned to their previous position, the video signal circuit resumes, and the drive is restored to the roller 8 to initiate a further cycle.

In FIG. 3, there is shown a structure similar to that shown in FIG. 1 and 2 but a different form of cutter assembly. In FIG. 3, the elements which are the same as those shown in FIGS. 1 and 2 have the same reference numerals as there shown. Thus, a record member 3 is drawn from a roll 2, past a fiber optics recording station 6 which, in turn, is a part of a cathode ray tube 4. A drive roller 62 is driven by the drive motor and control 11 under the control of the timing control circuit 22. The drive roller 62, in the structure shown in FIG. 3, engages the record member at the recording stations and also serves to press the record member against the face of the fiber optics strip 6. The cutter includes a stationary cutter bar 64 against which the record member 3 is selectively clamped by a clamp bar 66 which, in turn, is selectively actuated by a solenoid 68 under the control of the timing control circuit 22. The solenoid 68 operates through a pair of bell crank support levers 70 which support the clamp bar 66 and are pivoted about a transverse shaft 72. Also mounted on the shaft 72 is a cutter carrier block 74. A rotary bevelled cutter 76 is mounted on the block 74. A cutter drive motor 78, operable under the control of the timing control circuit 22 drives a first bevelled gear 80 which, in turn, drives a second bevelled gear 82. The bevelled gear 82 is keyed to a traverse feed screw (not shown). The traverse feed screw is of the well-known double traverse thread such as is found on the level-wind mechanism of fishing reels. The traverse feed screw, when rotated, causes the block 74, and hence, the cutter 76 to traverse once across the width of the record member to effect a shearing of the selected length of record member.

In operation, as before, the record member 3 is drawn from the roll 2 by the driving roller 62. The driving roller 62 is operated under the control of the drive motor and control circuit 11 which is, in turn, controlled by the timing control unit 22. The record member 3 is driven downward past the cutter assembly toward the guide tray 30 where it is deflected upward by the deflector 28 toward the clamp assembly 34. The counter 26 is connected to count the revolutions of the drive roller 62 and thereby count a measured length of record member, the predetermined count corresponding to that length of record member which will cause the free end of the record member 3 to be positioned between the jaws of the clamp assembly 34. As the record member is drawn past the fiber optics strip 6 of the CRT 4, a latent image signal is applied to the emulsion of the record member. When the counter has determined that the desired length of record member has been fed past the recording station 6, the timing unit control 22 stops the drive control circuit 11 and interrupts the video signal circuit 7. The clamp 34, under the control of the timing control unit 22, is activated to clamp the free end of the record member 3 between the jaws 32 and 40. At substantially the same time the solenoid 68 is actuated to cause the record member 3 to be clamped between the stationary cutter bar 64 and the clamp bar 66. It should be noted that the clamp bar 66 is electrically grounded. When the two clamps have been actuated the switch 36 is closed to cause an electrical current to be passed through the conductive backing of the record member 3 from the clamp jaw 32 to the clamp jaw 66. That electrical current provides the internal heat necessary to develop the latent image in the emulsion of the record member 3. While the current is being passed through the record member 3 the motor 78 may be energized under the control of the timed timing control unit 22 to drive the traverse screw attached to the bevelled gear 82, thereby causing the block 74 and the cutter 76 to traverse across the width of the record member, shearing off the desired length. At the end of the predetermined period of conduction, under control of the timing control circuit 22, the switch 36 is opened and, substantially at the same time, the clamp 66 is opened allowing the sheared end of the record member 3 to drop toward the tray 30. As that sheared end drops, the clamp 34 is opened. Following the opening of the clamp 34 the solenoid 50 is actuated to withdraw the deflector 28 and operate the kicker 52. And as before, the sheared off length of the record member is received in the receiving tray 58. The timing control unit 22 then starts the next cycle of operation for a subsequent record.

Thus it may be seen that there has been provided, in accordance with the present invention, an improved recording apparatus for light sensitive, heat developed recording medium of the type having a conductive back surface, which produces individual page or sheet copies and wherein no high voltage heating signals are applied to the record member during the recording process, nor are high frequency signals from the recording station applied to the apparatus during intervals of heat developing of the recorded image.

The embodiments of the invention in which an exclusive property or privilege is claimed are defined as follows:

1. A recording apparatus for a recording medium having a light sensitive, heat developed emulsion on a front surface thereof and an electrically conductive back surface, said apparatus comprising:
   means for exposing said emulsion surface to a selected light pattern to produce a latent image thereon,
   drive means for drawing said medium past said means for exposing, said drive means being positioned in close proximity to said means for exposing, a second member comprising an electrically conductive element positioned to engage said conductive surface of said recording medium,
   clamping means for periodically clamping said recording medium at a position a predetermined distance from said drive means, said clamping means including at least one jaw member of electrically conductive material positioned to engage said conductive surface of said medium, and
   means to selectively pass an electrical current through said conductive surface between said clamping means and said conductive member to cause said conductive surface of said medium to produce heat whereby to effect the development of said latent image.

2. A recording apparatus for a recording medium having a light sensitive, heat developed emulsion on a front surface thereof and an electrically conductive back surface, said apparatus comprising:
   means for exposing said emulsion surface to a selected light pattern to produce a latent image thereon,
   drive means for drawing said medium past said means for exposing, said drive means including a first and second roller means positioned in close proximity to said means for exposing, said first roller being a drive roller positioned to engage the emulsion side of said record member, said second roller comprising an electrically conductive roller positioned to engage said conductive surface of said recording medium,
   control means for controlling the timed operation of said apparatus,
   said drive means being connected to be responsive to said control means for controlled intermittent operation,
   clamping means responsive to said control means for periodically clamping said recording medium at a position a predetermined distance from said drive means, said clamping means including at least one jaw member of electrically conductive material positioned to engage said conductive surface of said medium, and
   means responsive to said control means to selectively pass an electrical current through said conductive surface between said clamping means and said conductive roller to cause said conductive surface of said medium to produce heat whereby to effect the development of said latent image.

3. A recording apparatus for a recording medium having a light sensitive, heat developed emulsion on a front surface thereof and an electrically conductive back surface, said apparatus comprising:
   control means for controlling the timed operation of said apparatus,
   means responsive to said control means for exposing said emulsion surface to a selected light pattern to produce a latent image thereon,
   drive means connected to be responsive to said control means for intermittently drawing said medium past said means for exposing, said drive means including a first and second roller means positioned in close proximity to said means for exposing, said first roller being a drive roller positioned to engage the emulsion side of said record member, said second roller comprising an electrically conductive roller positioned to engage said conductive surface of said recording medium, clamping means responsive to said control means, for periodically clamping said recording medium at a position a predetermined distance from said drive means, said clamping means including at least one jaw member of electrically conductive material positioned to engage said conductive surface of said medium, and means to selectively pass an electrical current through said conductive surface between said clamping means and said conductive roller to cause said conductive surface of said medium to produce heat whereby to effect the development of said latent image.

4. A recording apparatus for a recording medium having a light sensitive, heat developed emulsion on a front surface thereof and an electrically conductive back surface, said apparatus comprising:

control means for controlling the timed operation of said apparatus;

means responsive to said control means for exposing said emulsion surface to a selected light pattern to produce a latent image thereof;

drive means connected to be responsive to said control means for drawing said medium past said means for exposing, said drive means including a first and second roller means positioned in close proximity to said means for exposing, said first roller being a drive roller positioned to engage the emulsion side of said record member, said second roller comprising an electrically conductive roller positioned to engage said conductive surface of said recording medium;

clamping means responsive to said control means for periodically clamping said recording medium at a position a predetermined distance from said drive means, said clamping means including a first jaw member formed of electrically conductive material and mounted in a fixed position, and a second jaw member mounted for pivoted movement between an open and a closed position with respect to said first jaw member under the control of said control means, said first jaw member being positioned to engage said conductive surface of said medium; and means responsive to said control means to selectively pass an electrical current through said conductive surface between said clamping means and said conductive roller to cause said conductive surface of said medium to produce heat whereby to effect the development of said latent image.

5. A recording apparatus for a recording medium having a light sensitive, heat developed emulsion on a front surface thereof and an electrically conductive back surface, said apparatus comprising:

control means for controlling the timed operation of said apparatus;

means responsive to said control means for exposing said emulsion surface to a selected light pattern to produce a latent image thereof;

drive means connected to be responsive to said control means for drawing said medium past said means for exposing, said drive means including a first and second roller means positioned in close proximity to said means for exposing, said first roller being a drive roller positioned to engage the emulsion side of said record member, said second roller comprising an electrically conductive roller positioned to engage said conductive surface of said recording medium;

clamping means for periodically clamping said recording medium at a position a predetermined distance from said drive means, said clamping means including a first jaw member formed of electrically conductive material and mounted in a fixed position, and a second jaw member mounted for pivoted movement between an open and a closed position with respect to said first jaw member under the control of said control means, said first jaw member being positioned to engage said conductive surface of said medium;

means responsive to said control means to selectively pass an electrical current through said conductive surface between said clamping means and said conductive roller to cause said conductive surface of said medium to produce heat whereby to effect the development of said latent image;

shear means positioned closely adjacent but subsequent to said drive means for shearing off a predetermined length of said record medium, and means operatively connected to said shear means and responsive to said control means for actuating said shear means subsequent to said development of said latent image.

6. The apparatus as set forth in claim 5 wherein said means to selectively pass an electrical current through said conductive surface includes a switch means and a relay operatively connected to be selectively energized by said control means for actuating said switch means.

7. The apparatus as set forth in claim 5 wherein said means for actuating said shear means includes a solenoid means selectively energized from said control means.

8. The apparatus as set forth in claim 7 wherein actuating means are provided for effecting said movement of said second jaw member of said clamp means, said actuating means including a further solenoid means selectively energized from said control means.

9. The apparatus as set forth in claim 8 and further including guide means for guiding said record medium between said jaw members of said clamp means.

10. A recording apparatus for a recording medium having a light sensitive, heat developed emulsion on a front surface thereof and an electrically conductive back surface, said apparatus comprising:

control means for controlling the time operation of said apparatus;

means responsive to said control means for exposing said emulsion surface to a selected light pattern to produce a latent image thereof;

drive means connected to be responsive to said control means for drawing said medium past said means for exposing, said drive means including a first and second roller means positioned in close proximity to said means for exposing, said first roller being a drive roller positioned to engage the emulsion side of said record member, said second roller comprising an electrically conductive roller positioned to engage said conductive surface of said recording medium;

a counter means coupled to said drive roller to produce a count commensurate with the operation of said drive roller, said counter means including means to produce an output signal indicative of a predetermined count which is, in turn, representative of a predetermined length of said record medium, and means to apply said output signal to said control means to initiate a timing operation thereof;

clamping means responsive to said control means for periodically clamping said recording medium at a position a predetermined distance from said drive means, said clamping means including a first jaw member formed of electrically conductive material and mounted in a fixed position, and a second jaw member mounted for pivoted movement between an open and a closed position with respect to said first jaw member under the control of said control means, said first jaw member being positioned to engage said conductive surface of said medium; and means responsive to said control means to selectively pass an electrical current through said conductive surface between said clamping means and said conductive roller to cause said conductive surface of said medium to produce heat whereby to effect the development of said latent image.

11. A recording apparatus for a recording medium having a light sensitive, heat developed emulsion on a front surface thereof and an electrically conductive back surface, said apparatus comprising:

control means for controlling the timed operation of said apparatus;

means responsive to said control means for exposing said emulsion surface to a selected light pattern to produce a latent image thereof;

drive means connected to be responsive to said control means for drawing said medium past said means for exposing, said drive means including a first and second roller means positioned in close proximity to said means for exposing, said first roller being a drive roller positioned to engage the emulsion side of said record member, said second roller comprising an electrically conductive roller positioned to engage said conductive surface of said recording medium;

a counter means coupled to said drive roller to produce a count commensurate with the operation of said drive roller, said counter means including means to produce an output signal indicative of a predetermined count which is, in turn, representative of a predetermined length of said record medium, and means to apply said output signal to said control means to initiate a timing operation thereof;

clamping means responsive to said control means for periodically clamping said recording medium at a position a predetermined distance from said drive means, said clamping means including a first jaw member formed of electrically conductive material and mounted in a fixed position, and a second jaw member mounted for pivoted movement between an open and a closed position with respect to said first jaw member under the control of said control means, said first jaw member being positioned to engage said conductive surface of said medium;

guide means for guiding said record medium between said jaw member, said guide means including a guide tray of electrically nonconductive material and a deflector member being retractable under control of said control means;

means responsive to said control means to selectively pass an electrical current through said conductive surface between said clamping means and said conductive roller to cause said conductive surface of said medium to produce heat whereby to effect the development of said latent image;

shear means positioned closely adjacent but subsequent to said drive means for shearing of a predetermined length of said record medium, and means operatively connected to said shear means and responsive to said control means for actuating said shear means subsequent to said development of said latent image.

12. The apparatus as set forth in claim 11 and further including a kicker bar positioned adjacent said clamping means and operable under control of said control means to urge said sheared off record medium along said quick tray to a receptacle, said kicker bar and said retractable deflector member being simultaneously operable.

13. A recording apparatus for a recording medium having a light sensitive, heat developed emulsion on a surface thereof and an electrically conductive back surface, said apparatus comprising:

control means for controlling the timed operation of said apparatus;

means responsive to said control means for exposing said emulsion surface to a selected lift pattern to produce a latent image thereof;

drive means connected to be responsive to said control means for driving said medium past said means for exposing said drive means including a drive roller positioned in close proximity to said means for exposing;

a first electrically conductive contact member positioned to engage said conductive surface of said recording medium in close proximity to said means for exposing;

clamping means responsive to said control means for periodically clamping said recording medium at a position a predetermined distance from said drive means, said clamping means including a first jaw member formed of electrically conductive material and mounted in a fixed position, and a second jaw member mounted For pivotal movement between an open and a closed position with respect to said first jaw member under the control of said control means, said first jaw member being positioned to engage said conductive surface of said medium; and means responsive to said control means to selectively pass an electrical current through said conductive surface between said clamping means and said first electrically conductive contact member to cause said conductive surface of said medium to produce heat whereby to effect the development of said latent image.

14. A recording apparatus as set forth in claim 13 wherein said first electrically conductive contact member comprises a further clamping means operatively responsive to said control means for periodically clamping said record medium in close proximity to said drive means.

15. A recording apparatus for a recording medium having a light sensitive, heat developed emulsion on a front surface thereof and an electrically conductive back surface, said apparatus comprising:

control means for controlling the timed operating of said apparatus;

means responsive to said control means for exposing said emulsion surface to a selected light pattern to produce a latent image thereof;

drive means connected to be responsive to said control means for driving said medium past said means for exposing, said drive means including a drive roller positioned in close proximity to said means for exposing;

a first electrically conductive contact member positioned to engage said conductive surface of said recording medium in close proximity to said means for exposing;

clamping means responsive to said control means for periodically clamping said recording medium at a position a predetermined distance from said drive means, said claping means including electrically conductive first jaw member and mounted in a fixed poSition, and a second jaw member mounted for pivotal movement between an open position and a closed position with respect to said first jaw member under the control of said control means, said first jaw member being positioned to engage said conductive surface of said medium;

means responsive to said control means to selectively pass an electrical current through said conductive surface between said clamping means and said first electrically conductive contact member to cause said conductive surface of said medium to produce heat whereby to effect the development of said latent image;

shear means positioned closely adjacent to but subsequent to said drive means for shearing off a predetermined length of said record medium, and means operatively responsive to said control means for actuating said shear means subsequent to said development of said latent image.

16. A recording apparatus as set forth in claim 15 wherein said shear means comprises a fixed cutter bar and a movable cutter bar, both extending across the width of the recording medium, and a solenoid operated under the control of said control means for selectively actuating said movable bar after said electrical current has been passed through said conductive back surface.

17. A recording apparatus as set forth in claim 15 wherein said shear means comprises a fixed cutter bar extending across the width of said recording medium, a rotary cutter wheel, said cutter wheel being mounted on a carrier block, means operative under control of said control means for selectively causing said block and cutter wheel to traverse across the width of said recording medium.

18. A recording apparatus as set forth in claim 17 wherein said first electrically conductive contact member comprises a further clamp member, and a solenoid responsive to said control means to actuate said further clamp member to clamp said record medium against said fixed cutter bar substantially coincidentally with the closure of said first mentioned clamping means.

* * * * *